United States Patent
Uzrad-Nali et al.

(10) Patent No.: US 7,577,896 B2
(45) Date of Patent: Aug. 18, 2009

(54) APPARATUS AND METHOD FOR PERFORMING CYCLIC REDUNDANCY CHECK (CRC) ON PARTIAL PROTOCOL DATA UNITS (PDUS)

(75) Inventors: Oran Uzrad-Nali, Cupertino, CA (US); Kevin G. Plotz, Byron, MN (US); Phil L. Leichty, Rochester, MN (US)

(73) Assignee: Brocade Communications Systems, Inc., San Jose, CA (US)

( * ) Notice: Subject to any disclaimer, the term of this patent is extended or adjusted under 35 U.S.C. 154(b) by 533 days.

(21) Appl. No.: 11/258,377

(22) Filed: Oct. 26, 2005

(65) Prior Publication Data

US 2006/0114909 A1 Jun. 1, 2006

Related U.S. Application Data

(60) Provisional application No. 60/621,690, filed on Oct. 26, 2004.

(51) Int. Cl.
*H03M 13/00* (2006.01)

(52) U.S. Cl. .................. 714/758; 714/781; 714/801

(58) Field of Classification Search ............. 714/781, 714/758, 799, 801; 710/310; 370/412, 474
See application file for complete search history.

(56) References Cited

U.S. PATENT DOCUMENTS

| | | | | |
|---|---|---|---|---|
| 4,649,514 A | * | 3/1987 | Berger | 710/301 |
| 6,201,813 B1 | * | 3/2001 | Klausmeier et al. | 370/412 |
| 6,874,054 B2 | * | 3/2005 | Clayton et al. | 710/310 |
| 7,142,564 B1 | * | 11/2006 | Parruck et al. | 370/474 |
| 7,296,212 B1 | * | 11/2007 | Hammons, Jr. | 714/781 |
| 2003/0061623 A1 | * | 3/2003 | Denney et al. | 725/125 |
| 2004/0123013 A1 | * | 6/2004 | Clayton et al. | 710/310 |

* cited by examiner

*Primary Examiner*—Esaw T Abraham
*Assistant Examiner*—Fritz Alphonse
(74) *Attorney, Agent, or Firm*—Wong, Cabello, Lutsch, Rutherford & Brucculeri, LLP

(57) ABSTRACT

The present invention discloses an apparatus and method for performing cyclic redundancy check (CRC) on partial protocol data units (PDUs). The disclosed apparatus is designed to off-load the CRC calculation for transmit or receive from a host computer. According to the disclosed method, when generating CRC for partial PDUs, for each such PDUs a decision is made to determine whether a CRC action is required, i.e., if CRC should be calculated, checked or placed in the outgoing byte stream. When partial CRC calculation is performed the intermediate value is saved into memory and later is used for calculating the CRC for a consecutive partial PDU. In accordance with a preferred embodiment of the invention, the need to re-calculate the CRC in a case of a re-transmit request is eliminated.

17 Claims, 5 Drawing Sheets

APPARATUS AND METHOD FOR PERFORMING CYCLIC REDUNDANCY CHECK (CRC) ON PARTIAL PROTOCOL DATA UNITS (PDUS)

The application claims priority from provisional patent application 60/621,690, filed with the USPTO on 26 Oct. 2004, and is hereby incorporated by reference for all that it contains.

The following patents and published documents provide background information, for which they are incorporated herein by reference.

Patents
6,738,821 May 2004 Wilson, et al.
6,760,304 June 2004 Uzrad-Nali et al.
6,092,231 July 2000 Sze
5,930,525 July 1999 Gotesman, et al.

Published Applications
20040030757 February 2004 Pandya
20040030770 February 2004 Pandya
20040062267 April 2004 Minami; et al.
20040064815 April 2004 Uzrad-Nali et al.

TECHNICAL FIELD

The present invention relates generally to performing of cyclic redundancy check (CRC) value generation on protocol data units (PDUs), and more particularly for an apparatus and method for performing partial CRC calculations on partial PDUs.

BACKGROUND OF THE INVENTION

The rapid growth in data intensive applications continues to fuel the demand for raw data storage capacity. To meet this growing demand, the concept of the network storage systems was introduced. A network storage system is a network having a primary purpose of transferring of data between distributed computer systems and storage devices.

Network storage systems utilize the Internet Small Computer System Interface (iSCSI) protocol, which provides reliable data storage transport over a conventional transmission control protocol/Internet protocol (TCP/IP) network. The iSCSI protocol itself encapsulates small computer system interface (SCSI) commands in protocol data units (PDUs) carried in TCP/IP byte streams. That is, the iSCSI protocol allows network devices that are not connected by the same SCSI bus to communicate with each other over the Internet.

Data integrity is achieved by means of cyclic redundancy check (CRC) techniques. The CRC technique is used for checking and detecting errors in data transmitted over a network. The CRC algorithm and its underlying mathematics are well known to those skilled in the art. CRC value generation is performed when data is transmitted from a host computer to the network. The CRC value is calculated independently for a header and payload data portions included in an iSCSI PDU. The CRC value is calculated for each portion independently and inserted into the PDU at locations reserved the CRC values calculated for the header and payload portions. CRC value checking is performed when an iSCSI PDU is received at the host computer. Here, the CRC value is calculated and compared with a CRC value included in the PDU. The check is performed on both the header and payload portions.

Prior art implementations require the reception of an entire PDU before handling the CRC. Typically, an iSCSI PDU is composed of multiple data TCP segments that may have variable length size and further include data from more than one PDU. These segments are received in no particular order and multiple segments may be received from multiple different connections simultaneously. Therefore, in order to calculate the CRC value related to the payload data of a PDU, prior art implementations construct the entire PDU before handling the CRC. Specifically, these implementations are not design to calculate the intermediate CRC value for partial PDUs (e.g., TCP segments) while these partial PDUs are received or transmitted to the network. As an example, U.S. patent application Ser. No. 10/456,871 discloses a transport off-load engine (TOE) that performs CRC operations on iSCSI PDUs. The disclosed TOE receives a complete iSCSI PDU assembled by the host computer, calculates the CRC value, and sends the result back to the host computer.

It would be therefore advantageous to provide an efficient solution for performing CRC operations on partial PDUs.

DETAILED DESCRIPTION OF THE INVENTION

Figure 1:
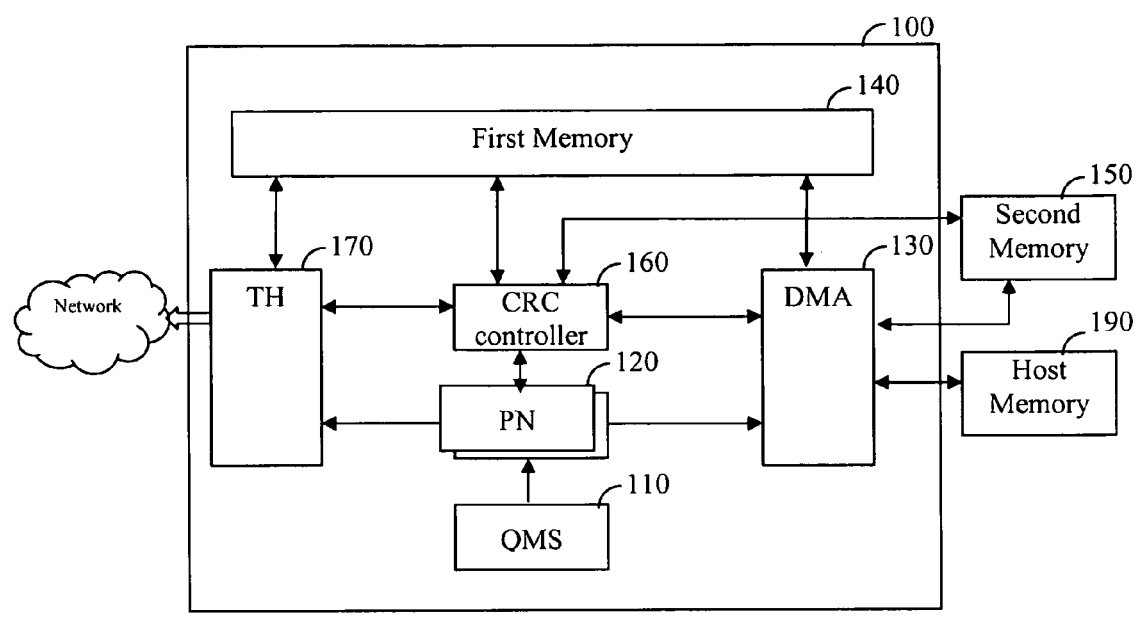
FIG. 1—is a non-limiting exemplary block diagram of the apparatus for performing CRC operations on partial PDUs according to the present invention FIG. 2—is an exemplary schema of an outbound byte stream FIG. 3—is an exemplary layout of memory object descriptor (MOD) array uses for forming a continuous outbound byte stream FIG. 4—is a non-limiting flowchart describing the method for generating intermediate CRC values in accordance with an exemplary embodiment of this invention FIG. 5—is a non-limiting flowchart describing the method for checking CRC values in accordance with an exemplary embodiment of this invention FIG. 6—is a non-limiting diagram illustrating the entry states and their respective transitions

Referring to FIG. 1, there is shown a non-limiting exemplary block diagram of an apparatus 100 for performing CRC operations on partial PDUs, such as those that are received in conjunction with an Internet Small Computer System Interface (iSCSI). Apparatus 100 is designed to off-load CRC value calculation for transmitted or received PDUs from a host computer. Apparatus 100 includes a queue manager and scheduler (QMS) 110, a plurality of processing nodes (PNs) 120, a direct memory access (DMA) controller 130, a CRC controller 160, a transmit handler (TH) 170, a first memory 140 coupled to the DMA controller 130, CRC controller 160, and TH 170, and a second memory 150 coupled to the CRC controller 160. Typically, the first memory 140 is implemented using dynamic random access memory (DRAM), and the second memory 150 is implemented using static random access memory (SRAM). QMS 110 manages a plurality of queues, where each queue may have a plurality of memory object descriptors (MODs). The queues and MODs are located in the second memory 150, and the MODs are added to the queue as new host events occur, e.g., reception or transmission of a data segment. The MOD according to the present invention has pointers, including, but not limited to, a pointer to a memory location, such as a memory location in first memory 140, in host memory 190, or to a CRC placeholder in the second memory 150. If the MOD is the last MOD in the series, then the next MOD pointer may be set to null. A detailed description of the MODs is found in U.S. Pat. Nos. 6,760,304 (hereinafter the "304 patent") and Ser. No.

10/219,673 (hereinafter the "673 application") both by Oran Uzrad-Nali et al., assigned to common assignee, and which is hereby incorporated by reference for all that they disclosed. CRC controller 160 and TH 170 operate together to calculate the intermediate CRC values of each segment as segments flow to the network. After processing the segments, the TH 170 routes the data in its network layer format to its destination.

Traffic is transmitted either in an outbound path or an inbound path. In the outbound path the intermediate CRC value is generated as data is transferred from either first memory 140 or host memory 190 to the network. The partial CRC generation is performed by CRC controller 160 and TH 170 under the control of PNs 120. Once a PN 120 decides to move data it sets up CRC controller 160 for the data movement and a CRC session is then established with TH 170, preparing it for the data movement. Subsequently, the respective PN 120 sends a series of commands to TH 170 to transfer the data and generate the intermediate CRC value. At the end of the session, the respective PN 120 sends one or more messages to TH 170 to complete the process.

In the inbound path the intermediate CRC values are calculated as data, received from the network, is transferred from the first memory 140 to host memory 190. The CRC value checking is performed by CRC controller 160 and DMA controller 130 under the control of PNs 120. Once a PN 120 decides to move data it sets up the CRC controller 160 for the data movement and a CRC session is then established with DMA controller 130, preparing it for the data movement. Subsequently, the respective PN 120 sends a series of commands to DMA controller 130 to transfer the data and perform the partial CRC calculations, checking the CRC value after all data for a session has been received. At the end of the session, the respective PN 120 sends one or more messages to DMA controller 130 to complete the process.

Figure 6:
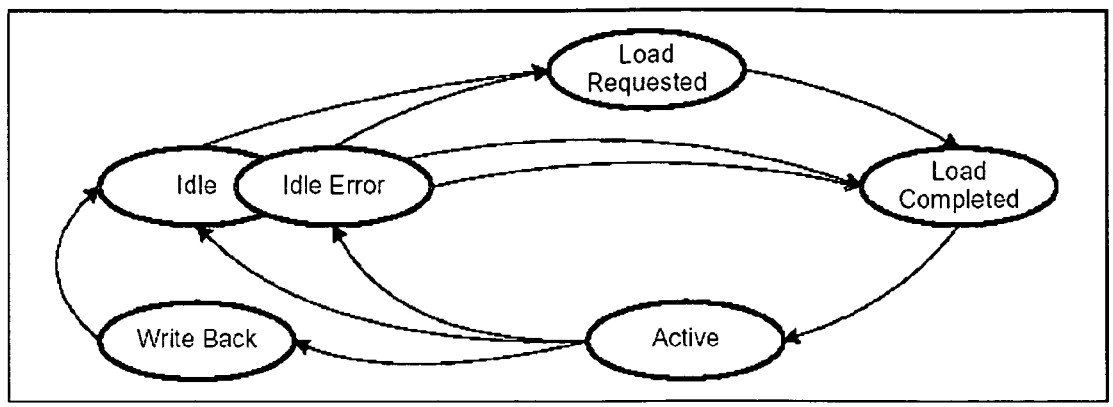

In order to support partial CRC operations on partial PDUs, intermediate CRC values are maintained in second memory 150. In addition, CRC controller 160 includes a database of intermediate CRC values (hereinafter the "CRC-DB") for maintaining intermediate CRC results. An entry in the CRC-DB includes the following fields: a state of the entry, an intermediate CRC value, and a location in second memory 150 of an intermediate CRC value. The entry's state may be one of: idle, idle error, load requested, load completed, active, and write back. A non-limiting diagrams illustrating the entry states and their respective transitions, is provided in FIG. 6. An idle state indicates that the entry is ready to be used in a next CRC session. An idle error state indicates that in a previous CRC session the entry was used for a CRC value check and a CRC error was detected. PN 120 may change the entry's state from an idle state or an idle error state only to the load requested state. The load requested state indicates that CRC controller 160 is retrieving an intermediate CRC value from second memory 150. As the intermediate CRC value is fetched from second memory 150, the entry's state is changed to the load completed state. At the load completed state, the intermediate CRC value (or an initial CRC value) is available to be used by TH 170 or DMA controller 130. The entry's state is changed to the active state when the intermediate CRC value in fetched by the TH 170 or DMA controller 130. The active state indicates that a CRC session with TH 170 or DMA controller 130 is in progress. The entry's state is changed from the active state to the write back state when the CRC session ends and TH 170 or DMA controller 130 requests to write back a new intermediate CRC value. If the CRC value check results in an error, the entry's state is changed to the idle error state. In the write back state, CRC controller 160 writes the intermediate CRC value back to second memory 150. An intermediate CRC value is the result of a partial CRC calculation preformed on a partial PDU.

Figure 2:
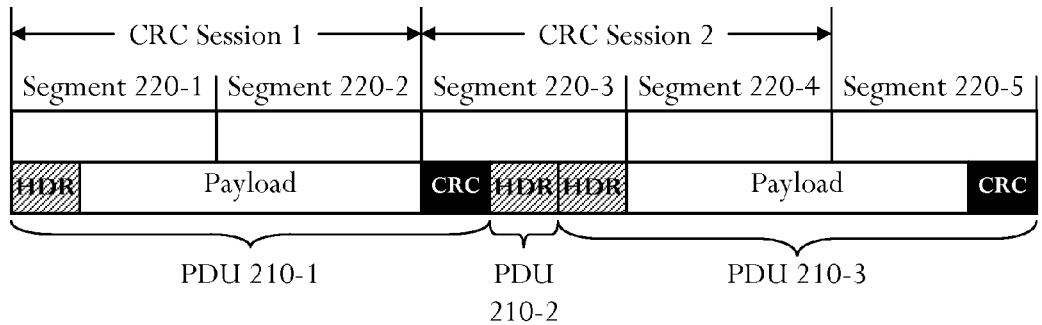

An outbound byte stream that requires CRC value generation comprises PDU payload data that resides in host memory 190 or first Memory 140; PDU headers reside in first memory 140. The outbound byte stream may be segmented into TCP segments. FIG. 2 provides an exemplary outbound byte stream that includes three PDUs 210-1, 210-2, and 210-3, that are segmented into five segments 220-1 through 220-5. Each of PDUs 210-1 and 210-3 contain a header, payload data, and a CRC trailer for holding the generated CRC code. PDU 210-2 includes only a header portion. Each portion of the PDU, i.e., payload data in host memory 190 or a header in first memory 140, is pointed to by a MOD, and the MODs are linked together to create a continuous byte stream. The linkage of MODs is performed in one of the queues, e.g., a transmit queue (TTQ) managed by QMS 110 under the control of a PN 120, prior to transmitting the byte stream to the network. The process for adding MODs and linking them using a linked list format for the purpose of forming a continuous byte stream is described in greater detail in the '304 patent and the '673 patent application.

To determine whether a intermediate CRC value should be generated for a portion pointed to by a MOD, each MOD is categorized once it is added to its respective queue. Specifically, the MOD types indicate whether the data in the portion pointed to by the MOD is payload data that is part of the intermediate CRC value generation, the data pointed to by the MOD does not require intermediate CRC value generation (e.g., PDU headers), or the MOD points to a CRC trailer in which the result of the CRC calculations is inserted. In the figures illustrating exemplary embodiments of the present invention, MODs shown as solid white blocks point to PDU payload data and hence intermediate CRC value generation is applied, MODs shown as solid black blocks point to CRC trailers, and MODs shown as hatched blocks point to PDU headers and hence CRC action is not performed.

Figure 3:
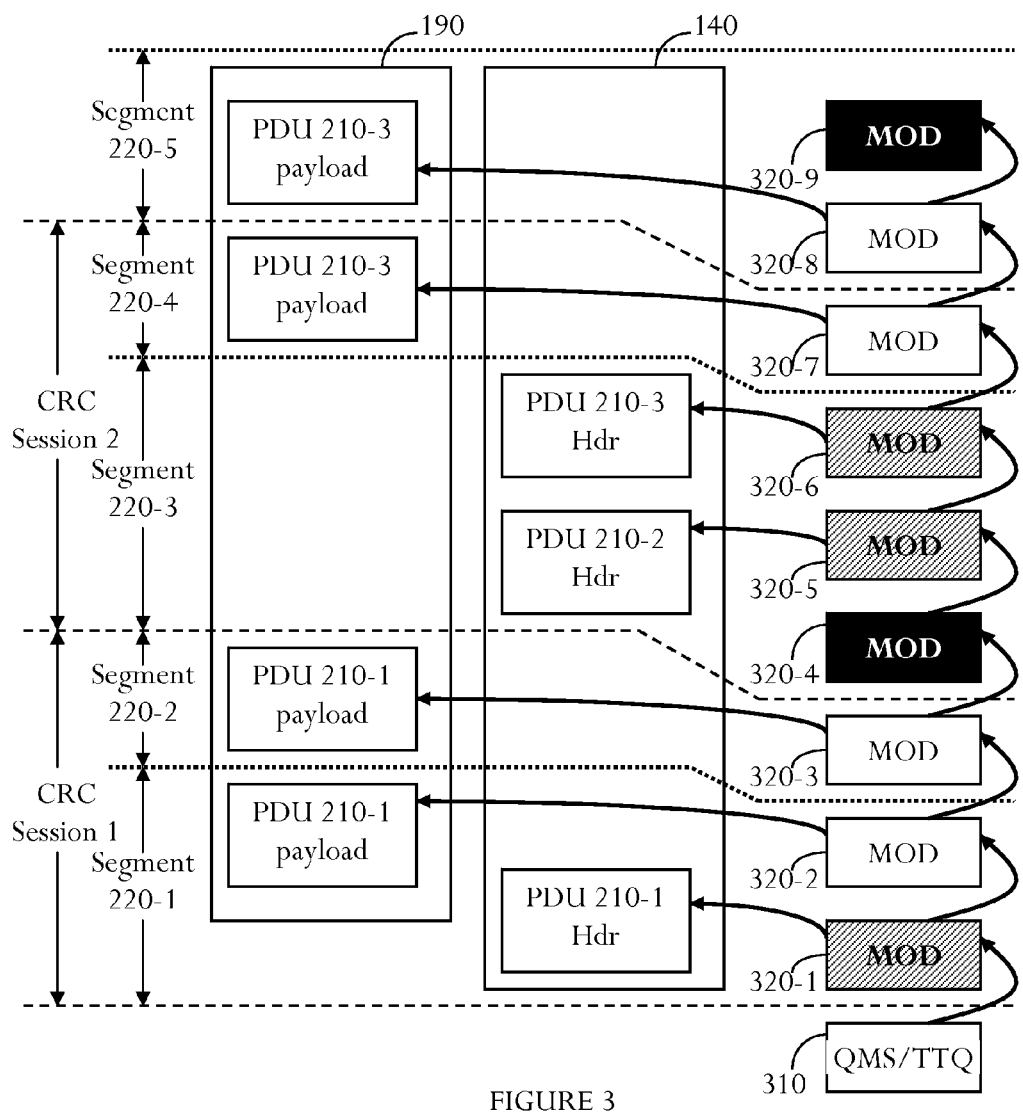

FIG. 3 provides a schematic diagram showing a layout of MODs pointing to PDU 210-1, 210-2, and 210-3 forming a continuous byte stream. The payload data of PDUs 210-1 and 210-3 are saved in host memory 190, while the header of PDUs 210-1, 210-2 and 210-3 are saved in first memory 140. QMS/TTQ 310 includes nine MODs 320-1 through 320-9, each categorized as either a header MOD, a payload MOD or a CRC MOD. MODs 320-1, 320-5 and 320-6 point to the headers of PDU 210-1, 210-2 and 210-3 respectively, and therefore are header MODs (shown as hatched blocks). MODs 320-2 and 320-3 point to two different locations in host memory 190 containing the payload data of PDU 210-1. These MODs are payload MODs (shown as sold white blocks), as CRC value generation should be performed when processing the payload data pointed by them. MODs 320-4 and 320-9 are immediate MODs used as a placeholder for the CRC generation result of PDUs 210-1 and 210-3 respectively. Therefore, these MODs are CRC MODs (shown as solid black blocks). MOD 320-7 and 320-8 are also payload MODs (also shown as solid white blocks) that each points to one of two locations in host memory 190 containing the payload of PDU 210-3. A detailed example for generating intermediate CRC values for the outbound stream depicted in FIG. 2 and FIG. 3 is provided below.

Figure 4:
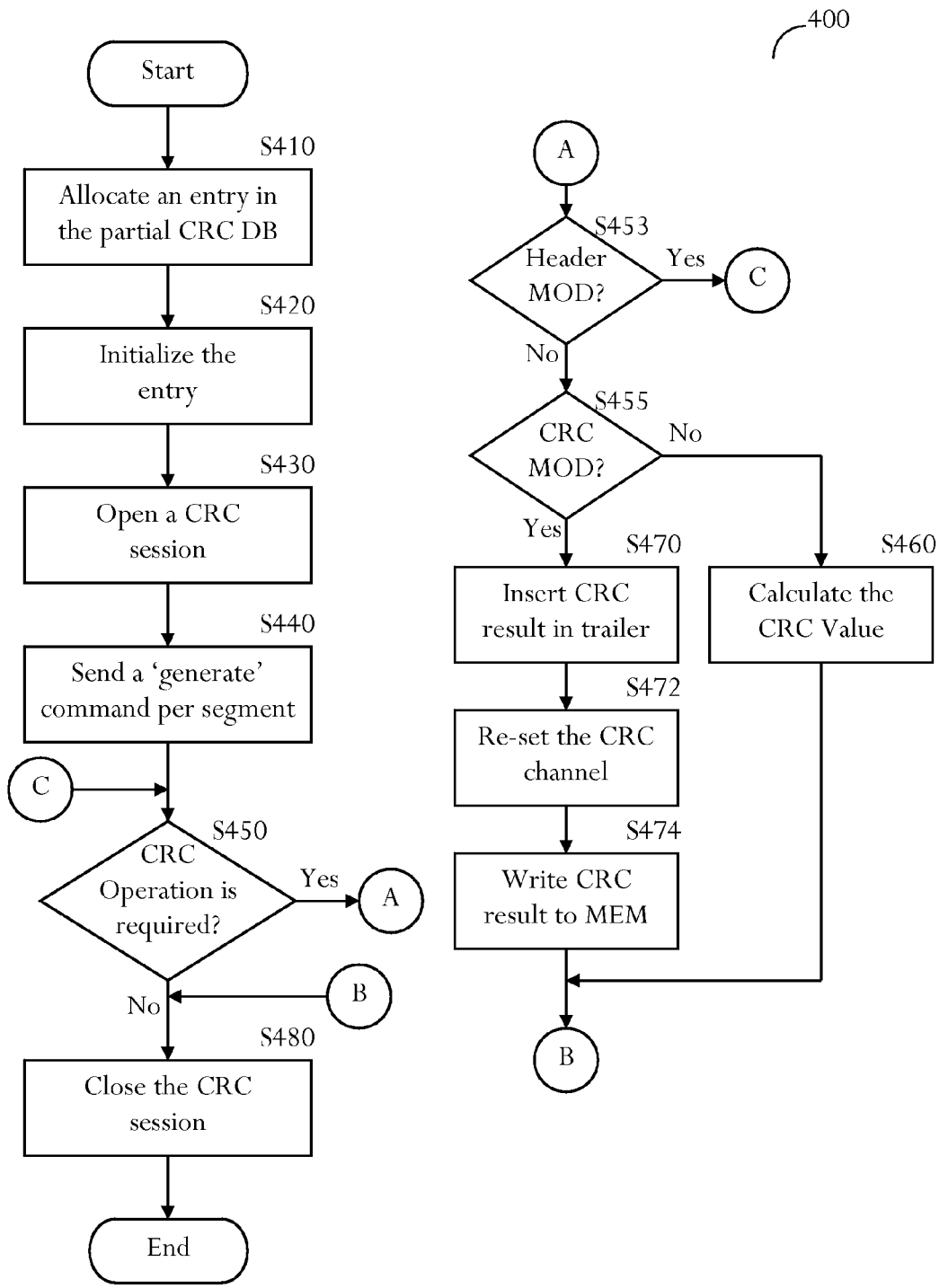

Referring to FIG. 4, a non-limiting flowchart 400 describing the method for generating intermediate CRC values for partial PDUs in accordance with an exemplary embodiment of the present invention is shown. The intermediate CRC value generation is performed through a CRC session established between CRC controller 160 and TH 170. At step S410, an entry is allocated in the CRC-DB. The state of the allocated entry is either an idle state or an idle error state. At step S420, the partial CRC field in the allocated entry is initialized with an initial CRC value. Alternatively, the partial CRC field may be initialized with an intermediate CRC value retrieved from second memory 150. As a result, the entry state is set either to load requested or load completed. At step S430, a CRC session is established with TH 170. This is performed by instructing TH 170 to retrieve the initial CRC value from the allocated entry. TH 170 maintains a plurality of CRC channels, each of which includes CRC channel identification (ID), a pointer to an entry in the CRC-DB, and an intermediate CRC value. Once a CRC session is established, the pointer in the CRC channel points to the allocated entry and the initial value retrieved from the entry is saved in CRC channel. The implementation of a plurality of CRC channels allows for interaction of multiple PNs 120 with TH 170, and pipelining of partial CRC calculations for better throughput.

At step S440, a 'generate' command is sent to TH 170 by a PN 120 that controls the process. The 'generate' command refers to a single data segment, of the byte stream, and includes a reference to the CRC channel. At step S450, a check is made to determine if it is required to calculate the intermediate CRC value for the data segment that the command refers to. For this purpose, TH 170 monitors the type of the MOD associated with the respective data segment, as the segment flows to its target network interface. At step S453, a check is made to determine whether the MOD is a header MOD. If so, the execution continues with step S450 where the next MOD is processed; otherwise, execution continues with step S455. At step S455, the type of the MOD is determined, and if the MOD is a payload MOD, i.e., partial CRC calculation is required, then at step S460 an intermediate CRC value for the segment is calculated. If the MOD is a CRC MOD, i.e., CRC insertion is required then at step S470, the current CRC result is inserted into the outgoing byte stream at the CRC trailer. The execution continues with step S472 where the intermediate CRC value of the CRC channel is set to the initial value, enabling the partial CRC calculations for the next PDU in the byte stream. At step S474, the CRC result is written to a placeholder MOD in second memory 150, in order to avoid the need for re-calculating the CRC result upon TCP re-transmit request. If a re-transmit request was sent, then TH 170 identifies the MOD, retrieves the CRC result from second memory 150 and sends it back as part of the byte stream. The CRC result is removed from second memory 150 when the TCP acknowledgement is received.

At step S480 the CRC session with TH 170 is closed and the CRC channel writes back the current channel intermediate CRC value to the allocated entry. As a result, the entry's state is changed to a write back state, and the intermediate CRC value is saved to second memory 150 to a location designated by the partial CRC location field.

It should be noted by one who is skilled in the art that the partial CRC calculation is performed as PDUs flow toward the network, hence, the partial CRC calculation is performed without consuming additional bandwidth from first memory 140.

Following is a detailed example for generating intermediate CRC values for partial PDUs for the outbound byte stream shown in FIG. 2 and the respective MOD layout shown in FIG. 3. The byte stream is transmitted to the network in two CRC sessions. In the first CRC session, only segments 220-1 and 220-2, with 512 bytes each, are sent. Upon receiving an event from QMS 110, an entry in the CRC-DB is allocated and subsequently this entry is initialized. The entry is initialized with an initial CRC value, since segment 220-1 is the beginning of PDU 210-1. Next, a CRC session with TH 170 is established while referring a CRC channel to the allocated entry and thereafter two 'generate' commands for segment 220-1 and segment 220-2 are sent to TH 170 by PN 120. For segments 220-1 and 220-2 only MODs 320-1 through 320-3 are monitored. MOD 320-1 is a header MOD, and therefore a CRC action is not performed, MODs 320-2 and 320-3 are payload MODs, and therefore the intermediate CRC value for the payload data pointed by these MODs is calculated. After processing segment 220-2, the first CRC session is closed and the intermediate CRC value is written back to the allocated entry and to a memory location in second memory 150 associated with this connection.

A second CRC session is established when a new event to transmit segments 220-3 and 220-4 is received from QMS 110. It should be further noted that events for other connections may arrive between the end of the first session and the beginning of the second session. Segment 220-3 is not at the beginning of a PDU, and thus TH 170 allocates an entry in the CRC-DB and retrieves the intermediate CRC value associated with the connection, which was previously calculated while processing preceding segment 220-2. The memory location of the intermediate CRC value is stored in the connection context. PN 120 issues a CRC 'generate' command with a reference to the CRC channel for both segments 220-3 and 220-4. For segments 220-3 and 220-4 only MODs 320-4 through 320-7 are monitored. MOD 320-4 is a CRC MOD, and therefore TH 170 replaces the CRC trailer with the CRC results, initializes the CRC channel in order to prepare it for PDU 210-3 and requests that CRC controller 160 write the CRC results to a location in second memory 150.

Figure 5:
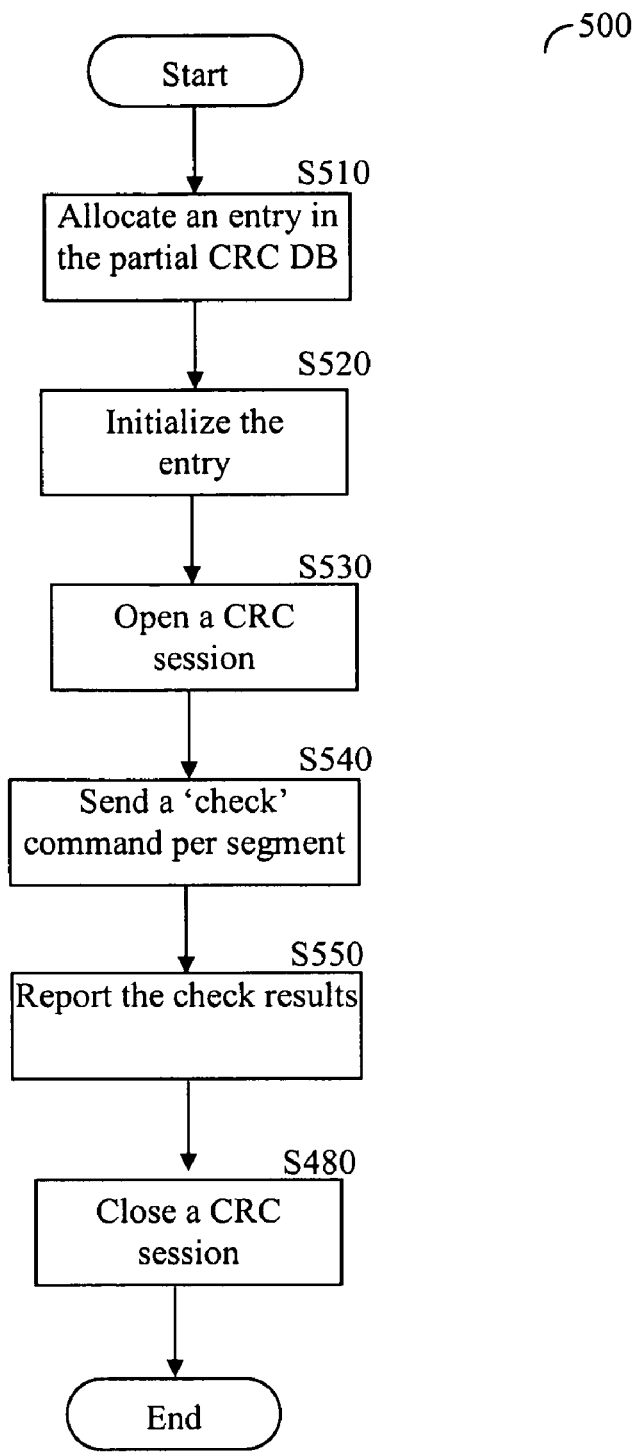

Referring to FIG. 5, a non-limiting flowchart 500 describing the method for calculating intermediate CRC values for partial PDUs and checking CRC values for the PDUs in accordance with an exemplary embodiment of the present invention is shown. The CRC value check is performed through a CRC session established between CRC controller 160 and DMA controller 130. At step S510, an entry is allocated in the CRC-DB. The state of the allocated entry is either an idle state or an idle error state. At step S520, the partial CRC field in the allocated entry is initialized with an initial CRC value. Alternatively, the partial CRC field may be initialized with an intermediate CRC value retrieved from second memory 150, previously calculated while processing a preceding segment. As a result, the entry state is set to a load requested or a load completed. At step S530, a CRC session is established with DMA controller 130 by instructing it to retrieve the initial CRC value from the allocated entry. DMA controller 130 maintains a plurality of CRC channels, each of which includes CRC channel identification (ID), a pointer to an entry in the CRC-DB, and an intermediate CRC value. Once a CRC session is established, the pointer in the CRC channel points to the allocated entry and the initial CRC value retrieved from the entry is saved in the CRC channel. The implementation of a plurality of CRC channels allows for interaction of multiple PNs 120 with DMA controller 130.

At step S540, a 'check' command is sent to DMA controller 130 by a PN 120 that controls the process. The 'check' command refers to a single data segment and includes a reference to the CRC channel. A CRC check is performed on payload data after TCP processing, and on delineated PDUs. The PN 120 that controls the process is aware of the position of the segments within the PDU. For a segment placed at the middle or the beginning of a PDU, the intermediate CRC value is calculated. For a segment at the end of a PDU, DMA controller 130 compares the calculated CRC result with the content of the CRC trailer. At step S550, The comparison result is reported back to CRC controller 160 and if an error was detected then the state of the allocated entry is changed to an idle error state. At step S560, the CRC session with DMA controller 130 is closed. As a result, the CRC channel writes back the current channel CRC value to the allocated entry. As a result, the entry's state is changed to a write back state and the intermediate CRC result is saved to second memory 150 to a location designed by the partial CRC location field.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An apparatus for processing protocol data units (PDUs), comprising:
   a cyclic redundancy check (CRC) controller that calculates a first intermediate CRC value for a first outbound partial PDU of a first plurality of outbound partial PDUs, and further calculates one or more subsequent intermediate CRC values for each of the first plurality of outbound partial PDUs remaining, a first outbound PDU comprising the first plurality of outbound partial PDUs; and
   a transmit handler that couples to the CRC controller, and that formats and routes to a network destination each of the first plurality of outbound partial PDUs as they are processed by the CRC controller;
   wherein the first intermediate CRC value is based upon an initial CRC value, and the one or more subsequent intermediate CRC values are each based upon an intermediate CRC value generated for a previously processed outbound partial PDU; and
   wherein a current outbound intermediate CRC value associated with the most recently processed of the first plurality of outbound partial PDUs is included within a CRC field of the first outbound PDU after the CRC controller processes a last partial outbound PDU of the first plurality of partial PDUs.

2. The apparatus of claim 1, further comprising:
   a memory coupled to the CRC controller and the transmit handler, the memory comprising a plurality of memory object descriptors (MODs), and the plurality of MODs organized in a linked list configuration;
   wherein each of the plurality of MODs is categorized as one of a plurality of MOD types selected from the group consisting of a header MOD, a payload MOD and a CRC MOD; and
   wherein the MODs are sequentially processed based upon the order of the MODs within the linked list.

3. The apparatus of claim 2,
   wherein each payload MOD comprises a pointer to one of a plurality of payload objects stored in the memory, and if a currently processed MOD is categorized as a payload MOD, the CRC controller calculates the current outbound intermediate CRC value based upon the data within a payload object pointed to by the currently processed MOD; and
   wherein the CRC controller does not calculate the current outbound intermediate CRC value if the currently processed MOD is categorized as either a header MOD or a CRC MOD.

4. The apparatus of claim 2, wherein the current outbound intermediate CRC value is included within the CRC field of the first outbound PDU if an MOD associated with the most recently processed of the first plurality of outbound partial PDUs is processed and categorized as a CRC MOD.

5. The apparatus of claim 2, wherein the value included within the CRC field of the first outbound PDU is stored within the memory, and wherein the saved CRC field value is included in one or more re-transmissions of the first outbound PDU.

6. The apparatus of claim 1, wherein the first outbound PDU comprises an Internet Small Computer System Interface (iSCSI) PDU.

7. The apparatus of claim 1, further comprising:
   a plurality of processing nodes each coupled to the CRC controller and the transmit handler, the plurality of processing nodes comprising a first processing node associated with the first outbound PDU, and further comprising a second processing node associated with a second outbound PDU comprising a second plurality of outbound partial PDUs;
   wherein a first of a plurality of CRC channels is associated with the first outbound PDU, and a second of the plurality of CRC channels is associated with the second outbound PDU; and
   wherein the first and second of the plurality of CRC channels together enable the transmit handler to interact with both the first and second processing nodes, and further together enable the CRC controller to pipeline partial CRC calculations for each of the first and second PDUs.

8. The apparatus of claim 1, further comprising:
   a direct memory access (DMA) controller coupled to the CRC controller; and
   a memory coupled to the DMA controller, the CRC controller and the transmit handler, the memory storing a plurality of partial inbound PDUs, and an inbound PDU comprising the plurality of partial inbound PDUs;
   wherein the DMA controller transfers each of the plurality of inbound partial PDUs to the memory as each of the plurality of partial inbound PDUs is received; and
   wherein the CRC controller calculates an intermediate CRC value for each of the plurality of partial inbound PDUs as each of the plurality of inbound PDUs is received.

9. The apparatus of claim 8,
   wherein if a current inbound intermediate CRC value is associated with a partial inbound PDU of the plurality of partial inbound PDUs that is at the end of the inbound PDU, the DMA controller compares the current inbound intermediate CRC value to a received CRC value within the inbound PDU; and
   wherein an error is signaled by the DMA controller to the CRC controller if the current inbound intermediate CRC value does not match the received CRC value.

10. A method for processing protocol data units (PDUs), comprising:
    a cyclic redundancy check (CRC) controller calculating a first intermediate CRC value for a first outbound partial PDU of a plurality of outbound partial PDUs, the first intermediate CRC value being based upon an initial CRC value, and a first outbound PDU comprising the plurality of outbound partial PDUs;
    the CRC controller calculating one or more subsequent intermediate CRC values for each of the plurality of outbound partial PDUs remaining, the one or more subsequent intermediate CRC values each being based upon an intermediate CRC value generated for a previously processed outbound partial PDU;

a transmit handler formatting and routing to a network destination each of the plurality of outbound partial PDUs for which intermediate CRC values have been calculated; and the transmit handler including a current outbound intermediate CRC value within a CRC field of the first outbound PDU after processing a last partial outbound PDU of the plurality of partial PDUs.

11. The method of claim 10, further comprising:

storing in a memory a plurality of memory object descriptors (MODs);

a queue manager organizing the MODs in a linked list configuration;

the transmit handler sequentially processing the MODs based upon the order of the MODs in the linked list; and categorizing each of the plurality of MODs as one of a plurality of MOD types selected from the group consisting of a header MOD, a payload MOD and a CRC MOD.

12. The method of claim 11, further comprising:

including within each payload MOD a pointer to one of a plurality of payload objects;

the CRC controller calculating the current outbound intermediate CRC value, if a currently processed MOD is categorized as a payload MOD, based upon the data within a payload object pointed to by the currently processed MOD; and the CRC controller forgoing the calculating of the current outbound intermediate CRC value if the currently processed MOD is categorized as either a header MOD or a CRC MOD.

13. The method of claim 11, further comprising the transmit handler performing the including of the current outbound intermediate CRC value within the CRC field of the first outbound PDU if an MOD associated with the most currently processed of the plurality of outbound partial PDUs is processed and categorized as a CRC MOD.

14. The method of claim 10, further comprising:

saving in the memory the value included within the CRC field of the first outbound PDU; and the transmit handler including the saved CRC field value in one or more re-transmissions of the first outbound PDU.

15. The method of claim 10, further comprising:

a first processing node associating a first of a plurality of CRC channels with the first outbound PDU;

a second processing node associating a second of the plurality of CRC channels with a second outbound PDU; and the first and second processing nodes communicating with the transmit handler and pipelining partial CRC calculations for both the first and second CRC channels.

16. The method of claim 10, further comprising:

a direct memory access (DMA) controller storing a plurality of partial inbound PDUs as each of the plurality of partial inbound PDUs is received, an inbound PDU comprising the plurality of partial inbound PDUs; and the CRC controller calculating an intermediate CRC value for each of the plurality of partial inbound PDUs as each of the plurality of partial inbound PDUs is received.

17. The method of claim 16, further comprising:

the DMA controller comparing a current inbound intermediate CRC value to a received CRC value included within the inbound PDU, the current inbound intermediate CRC value associated with a partial inbound PDU of the plurality of partial inbound PDUs that is received at the end of the inbound PDU; and the DMA controller signaling an error to the CRC controller if the current inbound intermediate CRC value does not match the received CRC value.

* * * * *

UNITED STATES PATENT AND TRADEMARK OFFICE
CERTIFICATE OF CORRECTION

PATENT NO. : 7,577,896 B2  Page 1 of 1
APPLICATION NO. : 11/258377
DATED : August 18, 2009
INVENTOR(S) : Uzrad-Nali et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 829 days.

Signed and Sealed this

Seventh Day of September, 2010

David J. Kappos
*Director of the United States Patent and Trademark Office*